July 14, 1942.　　　　C. H. GRANT　　　　2,289,704
AIRCRAFT WING
Filed Feb. 26, 1940　　　　3 Sheets-Sheet 3
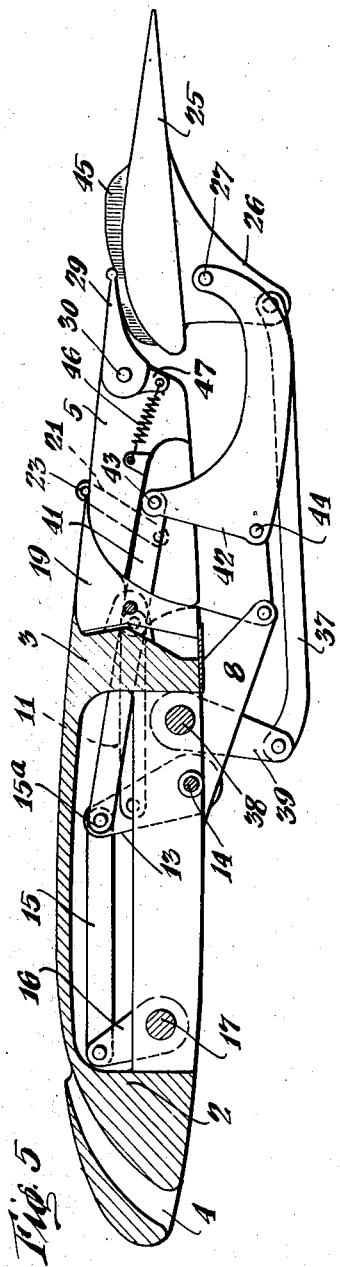
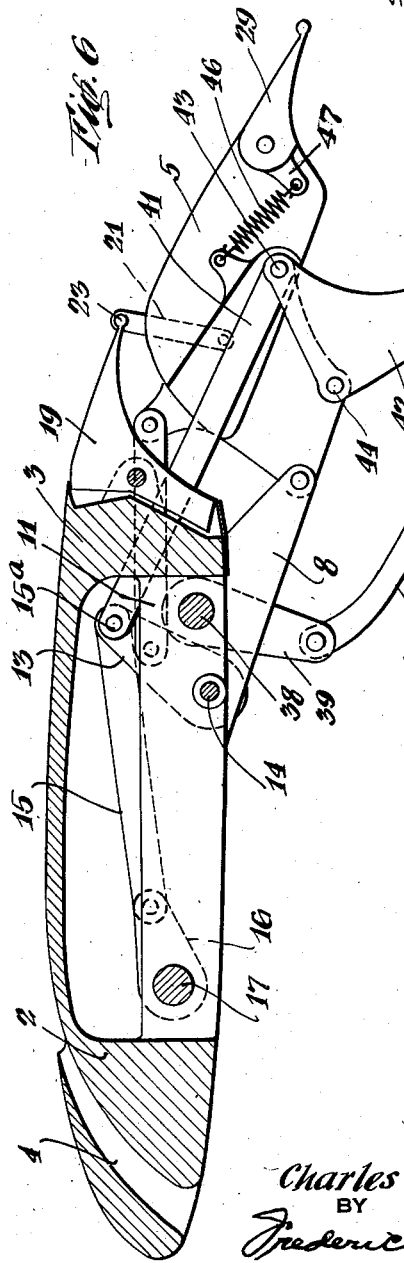
INVENTOR
Charles H. Grant
BY
Frederick W. Barker
ATTORNEY Patented July 14, 1942

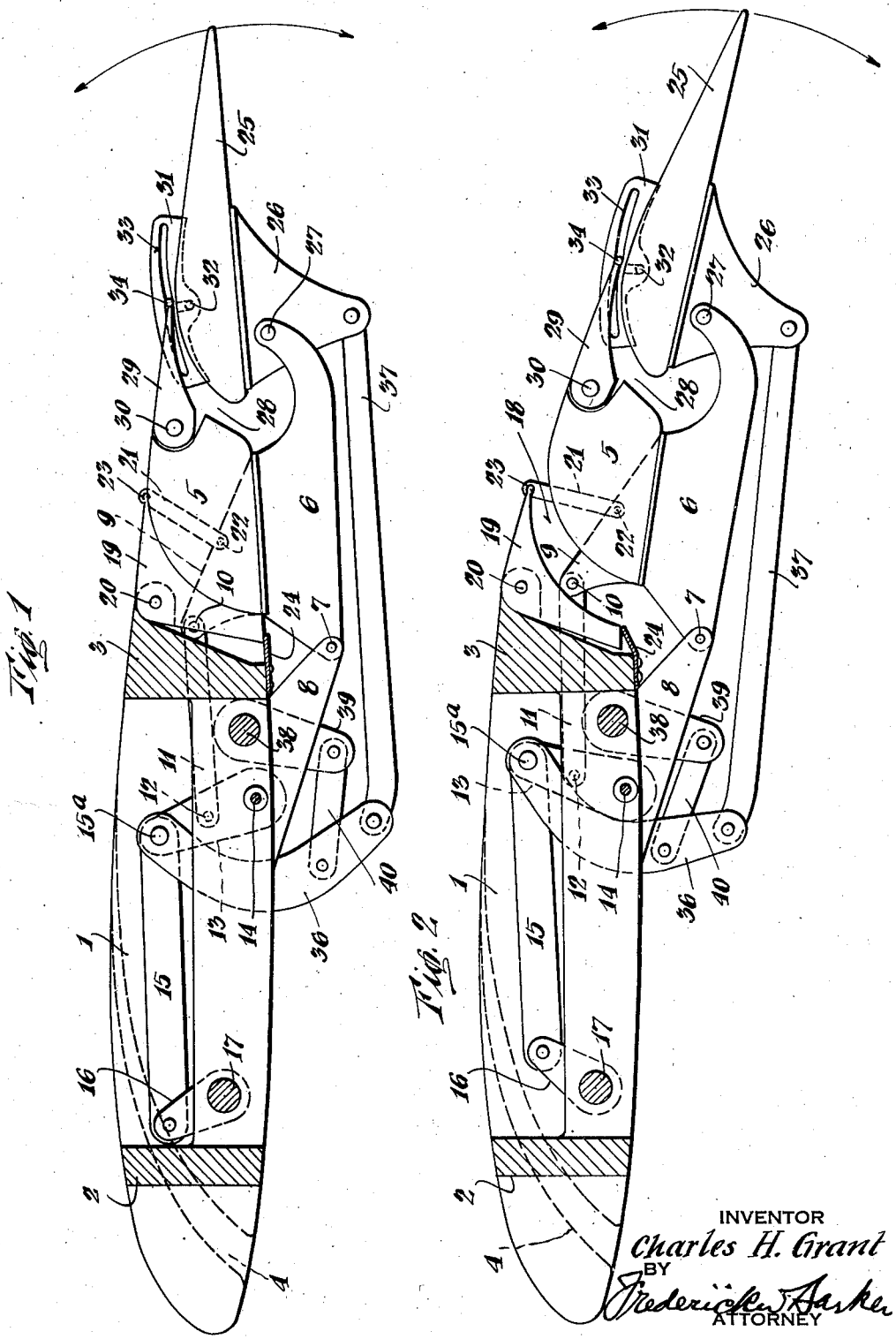

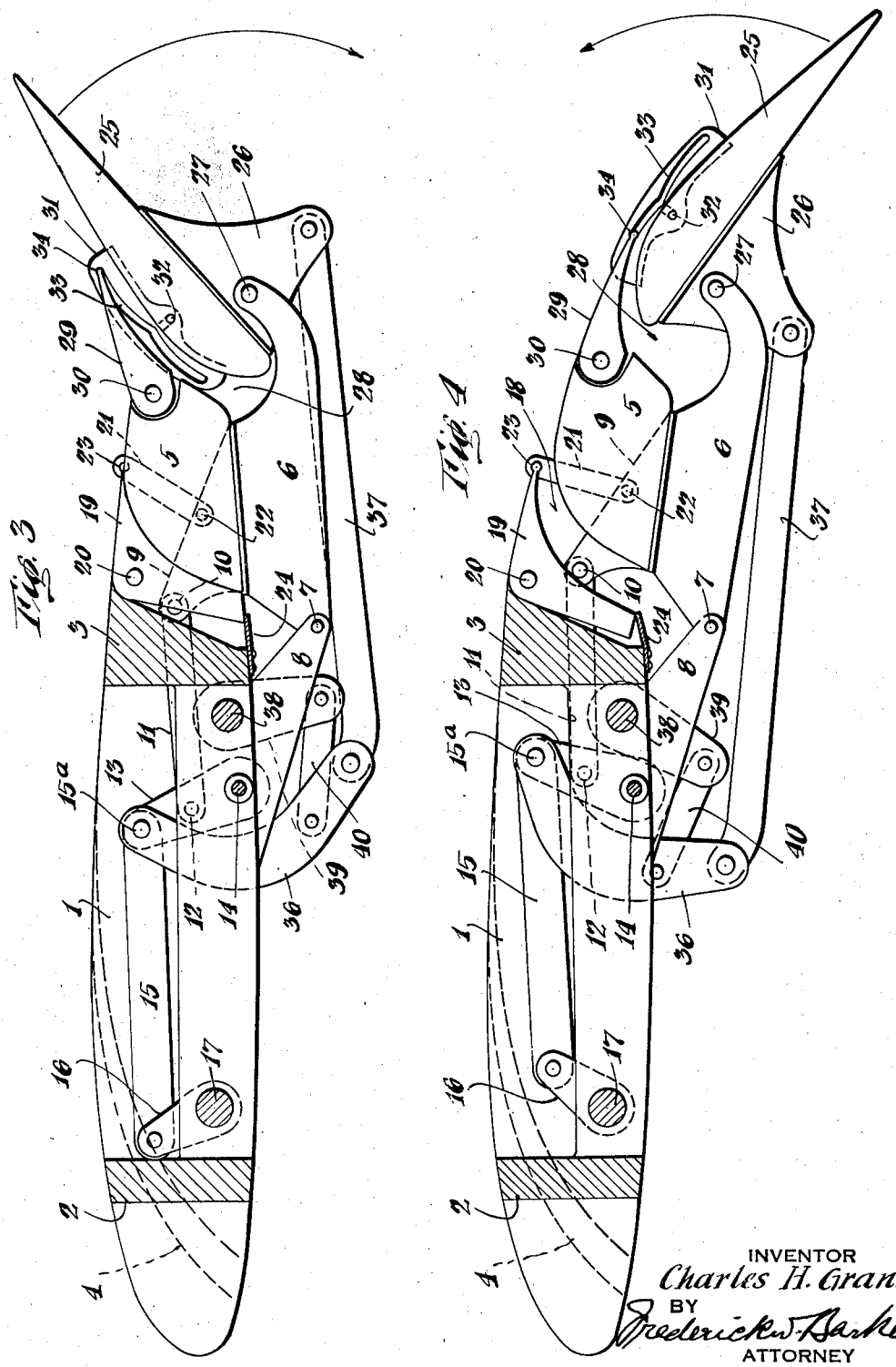

2,289,704

UNITED STATES PATENT OFFICE 2,289,704

AIRCRAFT WING

Charles H. Grant, New Rochelle, N. Y.

Application February 26, 1940, Serial No. 320,736

7 Claims. (Cl. 244—42)

This invention relates to an aircraft wing whose rear portion may be depressed as a flap and the after end sections of this flap may be operated as ailerons. The wing is made up of a forward rigid portion, and a flap hinged to said rigid portion. The flap is composed of two or more separate wing members each hinged to the preceding one, in series. These members may function unitedly as a flap through certain control mechanism. Simultaneously with the operation of all members as a flap the rearmost end members may also be operated independently as ailerons.

In brief the portion of the wing to the rear of the rigid portion may be depressed as a flap. This portion is composed of two or more segments whereof the last or rearmost segment may be operated as an aileron.

When a flap that is without slots between the segments is depressed the air flow is broken and turbulence exists over the flap. The operation of the last segment as an aileron under these conditions would not provide effective action because there is no undisturbed smooth flow of air over and under the aileron to make it effective. If the flow of air over the flap and aileron is kept smooth and kept from breaking away from the upper surface of the flap and aileron, the last segment may be operated efficiently as an aileron. This has been the problem.

Thus slots have been introduced by me in the flap to ensure a smooth air flow over the flap and aileron. Because of these slots the air flow is kept from breaking away from the aileron when the flap is in the depressed position and also when the aileron is fully depressed. The slots therefore make the aileron effective provided they are of correct design.

Without the slots the air flow would break over the flap and aileron and would cause drag without lift on the aileron, and this would destroy its effectiveness.

In one combination the aileron segment of the flap is lowered or depressed away from the first flap segment so that it is disposed in the free air flow passing under the wing, in a position approximately parallel with the air flow. It is thus more horizontal than it would be if it served as the rear segment of a normal two segment flap. Because it is depressed or lowered into the free air stream it has greater lifting and depressing effect when actuated as an aileron. This is due to the greater volume and smoothness of the air flow passing over and under the aileron segment when it is lowered to such a position. Because the lowered aileron is in an approximately horizontal position the lift component of the forces acting on its surface is large and the drag is small. Thus the greatest possible aileron effect is obtained by lowering the aileron segment and disposing it in an approximately horizontal attitude.

When the flap is in the raised or high speed position low drag will be the result if the slots are closed. Therefore a special slot controller has been provided for all members of the flap. The volume and velocity of the air emitted from the slot governs the lift of the flap and the effectiveness of the aileron, for these factors affect the boundary layer of air on the upper surface.

Thus the slot controller is designed to operate in connection with the following flap member to regulate the upper opening of the slot through which the air makes its exit, in a correct amount, reducing the exit opening which normally would be too large when the following member is depressed and increasing the opening at the bottom or intake end of the slot, in order to allow a larger volume of air to enter and pass through the slot, than would be the case otherwise.

In other words, the upper rear tip of the slot controller may be depressed to reduce the slot opening to the correct degree while simultaneously the lower end or heel of the controller moves away from the following member, to increase the slot intake opening. This controller, because of the character of its inner surface, provides a smooth, regularly curved surface to the air flowing through the slot. In this way the slot opening is caused to be of approximately Venturi-shape and regular in cross section so that the air passing through it does not incur multiple phases of expansion and contraction. Such a condition would absorb energy and reduce the volume and velocity of the air being emitted from the slot at its outlet opening at the top of the wing.

A cam on each aileron member operates a slot controller and thus controls the slot opening formed by the aileron member and the flap member preceding it. When the aileron is in either the raised or depressed position the slot is opened to allow air to pass through the slot and over the upper surface of the aileron. The slot is partly open in the normal or neutral position so that air may pass through it to ensure smooth air flow over the upper surface of the aileron member of the flap when the whole series of members is depressed as a flap. Thus it forms a slot in the flap which changes in degree of opening to allow the proper amount of air to pass through when the flap member is operated as an aileron.

There is a control system to operate the flap and aileron members simultaneously and a separate control system to operate the aileron member independently. A nose slot may be used in conjunction with this organism. This improves the effect of the flap and aileron as it induces a smoother air flow over the rigid wing portion and over the flap and aileron as well.

Two types of slot controller guides are shown; one a link, the other a cam. Either type may be used on any one or all of the slot controllers to enable their functioning.

In a modified form of my invention I provide means for shifting the aileron member into a level that is substantially below the level occupied by the main or preceding flap member, when said flap member is depressed, to thereby leave a clearance space intermediate these members, whereby said aileron may be more efficiently influenced by the encountered air pressures.

This modified form requires the use of additional control mechanism for its operation as will be described hereinafter.

Other features and advantages of my invention will hereinafter appear.

In the drawings—

Figure 1 is a side sectional view of an airplane wing, showing the flap and aileron members in normal attitude thereof.

Fig. 2 is a similar view with the flap and aileron group depressed.

Fig. 3 is a similar view with the flap member in normal raised position and the aileron segment angled upwardly.

Fig. 4 is a similar view, with the flap member depressed and the aileron element depressed relatively to the attitude of said flap member.

Fig. 5 is a side elevation of the wing in a modified form wherein the flap and aileron members are in the normal neutral position, and Fig. 6 is a side elevation of said modified form, wherein the flap member is depressed and the aileron member is lowered away from said flap element to be thus spaced therefrom, leaving a substantial intermediate clearance therebetween.

In Figs. 1 to 4 let 1 indicate the forward portion of a wing which includes the front spar 2 and rear spar 3. A curved slot 4 extends through this forward portion from a point near the nose at the underside thereof, upwardly and rearwardly to its exit at the upper side surface, to provide a pressure flow over the wing upper surface. This slot is of gradually diminishing cross-sectional area throughout its upward and rearward extent to afford a Venturi-like effect.

A flap member 5 has a bracket 6 attached to its under side, this bracket 6 being pivotally connected, as at 7, to a fixed bracket 8 that depends from the wing forward portion 1, these pivotal means forming the main connection between the flap 5 and forward wing portion 1.

Flap 5 also carries a bracket 9 which has pivotal connection, at 10, with a member 11, or flap control link, that is pivoted at 12 to a crank 13 which serves as a flap control arm, said crank 13 being fulcrumed at 14 to wing portion 1. A pitman 15, pivoted at 15a, connects the crank 13 with a crank 16 that is carried by a shaft 17, which latter is rotatable by usual means (not shown) installed in the pilot's cockpit. By the train of mechanism thus described and illustrated the flap 5 is caused to be depressed away from the forward wing portion 1 and brought back into alignment therewith, according to the direction of rotation given the shaft 17.

In depressing the flap 5 a slot 18 is provided between the leading edge of said flap and a member 19 of bell crank character which I call a slot controller, said member 19 being in pivotal engagement at 20 with the spar 3, and movable to both close and open slot 18 as the flap is shifted between its normal and depressed positions. A link 21, pivoted at one end 22 to flap 5, is pivoted at its other end 23 to the rearmost portion of member 19. It should be noted that the leading edge of flap 5 and the opposed surface of member 19 have coincident contours, so that when said flap is in normal position no slot opening exists therebetween. But, as the flap 5 is being depressed the slot 18 is opened up. It is desirable, according to my invention, to create a Venturi-like effect for the passage of air through the slot, for which purpose the slot controller 19 is caused, in the depressed movement of the flap, to swing forwardly on its fixed pivot 23 under the guidance of link 21 and its fixed pivotal connection 22 with flap 5. This forward movement of slot controller 19 with the depressed movement of flap 5 increases the cross-sectional area of the slot from its exit end to its inlet. Hence the pressure of air entering the slot is increased at its exit, to flow more effectively over the flap surface. Obviously a clearance in the trailing edge portion of wing member 1, here represented by the spar 3, is necessary to permit the forward movement of controller 19, and, in order that such clearance may be closed at its entrance, when the flap is in normal attitude, I provide a strip 24, secured to member 1 and projecting rearwardly to cover said clearance entrance.

Other flap members are provided rearwardly of flap 5 and adapted to be depressed therewith for high lift purposes, slots similar to that indicated at 18 occurring as the flap is deflected.

In the example indicated in Figs. 1 and 2 these rearward flaps are represented at 25 and each of these flaps 25 has a depending lug 26 that is in pivotal engagement, as at 27, with an upwardly curved, terminal portion of a bracket 6, whereby, in the operation of the train which actuates flap 5, said flap 25 is caused to rotate on pivot 27 and thus to describe its extended portion of the flap arcuate movement.

The slot 28, between flaps 5 and 25, is normally held slightly open by a controller member 29 when the wing is in flying attitude, said member 29 forming a bridging portion of the wing upper surface and being in pivotal engagement at 30 with the rear portion of flap 5. But as the flap member 25 becomes depressed in the flap movement aforesaid, slot 28 opens more fully through the agency of a slotted cam member 31, secured at 32 to flap member 25 and having a curved slot 33 which engages the pin 34 that is entered within the trailing edge of member 29. Due to the curvature of slot 33 the controller 29 will be caused to increase the exit opening of slot 28 in the depressed movement of flap 25.

With the instrumentalities thus far described and illustrated it will be apparent that herein is presented an airfoil in segmental, articulated form at its rear portion, having intermediate slots that expand more at their inlets than at their outlets, to intensify the pressure of air that is to flow over the wing surface, according to the degree of curvature assumed by said rear or flap portion in its depression.

While the rear flap member 25 forms with flap member 5 a complete flap, these members operating in unison, said rear flap member 25 (see particularly Figs. 3 and 4) is also provided with independent control means which enable it to function as an aileron, both in the flying attitude of the wing and as the flap portion 5 thereof is depressed. Thus, an aileron differential arm, indicated at 36, pivoted at 15a, is pivotally connected with bracket 26 by an aileron control link 37.

The individual operating means for flap member 25 as an aileron consists of a shaft 38, which is actuated by known means (not shown) from the pilot's cockpit. Attached to shaft 38 is a crank 39, pivotally connected to differential arm 36 by a link 40. Hence, the rotation of shaft 38 will be communicated through the train of members 39, 40, 36 and 37 to the flap-aileron member 25, for its depression or elevation, according to the direction of such rotation, this operation being independent of the control, emanating from shaft 17, of the flap members 5 and 25 for flap control.

In the modification of my invention illustrated in Figs. 5 and 6 the same structures and arrangements are employed as with the form thereof illustrated in Figs. 1 to 4, with the addition of a bell-crank, composed of the members 41, 42, which are pivotally interconnected at 43, the member 41 being pivoted to link 11, and the member 42 being pivoted, at 44, to the bracket 6 that depends from flap member 5.

The effect of this arrangement is to cause the aileron member 25, in the depressed movement of flap member 5, to be moved downwardly as to the position thereof indicated in Fig. 6, thereby creating a wide gap between said aileron member 25 and flap member 5, in which separated position said aileron member is rendered more susceptible to pressure influence in the performance of its control functions. In other respects said member 25 is responsive to control as a flap member.

A curved strip 45, carried by flap-aileron member 25 serves to hold controller member 29 spaced from the upper surface of said flap-aileron member, when the wing is in its high speed attitude; a coiled spring 46, anchored to flap member 5, and engaging a lug 47 on member 29, tensions said member 29 against strip 45.

Variations within the spirit and scope of my invention are equally comprehended by the foregoing disclosure.

I claim:

1. An aircraft wing comprising a forward rigid portion and a rearward portion composed of a plurality of flap-like members that are pivotally interconnected with each other and with said forward portion, control means carried by said forward portion for depressing said rearward portion that it may function as a flap, pivotal means connecting the rearmost member with its next adjacent member whereby in the depressed movement of said rearward portion said rearmost member is shifted into spaced relation below said adjacent member, and separate control means, carried by said forward portion, for the independent operation of said rearmost flap-like member as an aileron.

2. In an aircraft wing, a rigid forward portion, a rearward flap member, pivotal means connecting said flap member and forward portion, a controller element, of bell crank character, pivoted to said forward portion and lying in abutting relation with said flap member, the opposed surfaces of said flap member and controller element being coincidently curved to interfit when the wing is extended for normal flight, means for depressing said flap member, and means engaging said controller element with said flap member causing a slot to be created between the flap member and controller element in the depressed movement of said flap member.

3. The subject matter of claim 2 wherein the means that engages the controller element with the flap member rocks said controller element and causes it to expand the slot inlet to a greater extent than the outlet.

4. In an aircraft wing, a rigid forward portion, a rearward flap member, pivoted to said forward portion, means for depressing said flap member, an aileron, pivoted to said flap member in spaced relation and operable therewith, connecting means between said aileron and flap member to vary the spaced relation therebetween, and independent control means for said aileron.

5. In an aircraft wing, a rigid forward portion, a rearward flap member, pivoted to said forward portion, means for depressing said flap member, an aileron, pivoted to said flap member in spaced relation and operable therewith, a controller element, pivoted to said flap member to permit and regulate the flow of air between said aileron and flap member, engaging means between the aileron and flap member to vary the spaced relation therebetween, and independent control means for said aileron.

6. In an aircraft wing, a rigid forward portion, a rearward flap member in pivotal relation with said forward portion, an aileron pivotally connected with said flap member and operable therewith as a part thereof, pivotal means connecting said aileron with said flap member, enabling said aileron to be lowered away from said flap member, and independent means for operating said aileron as such.

7. In an aircraft wing, a rigid forward portion, a rearward flap member, pivotal means connecting said flap member and forward portion, a controller element pivoted to said forward portion and lying against said flap member when the wing is extended for forward flight, means for depressing said flap member, and means connecting said controller element with said flap member causing a slot to be created between the flap member and controller element in such depressed movement, the means connecting the controller element with the flap member serving to expand the slot inlet to a greater extent than the outlet.

CHARLES H. GRANT.